No. 898,398. PATENTED SEPT. 8, 1908.
F. B. WOOD.
SPOOL.
APPLICATION FILED DEC. 12, 1907.
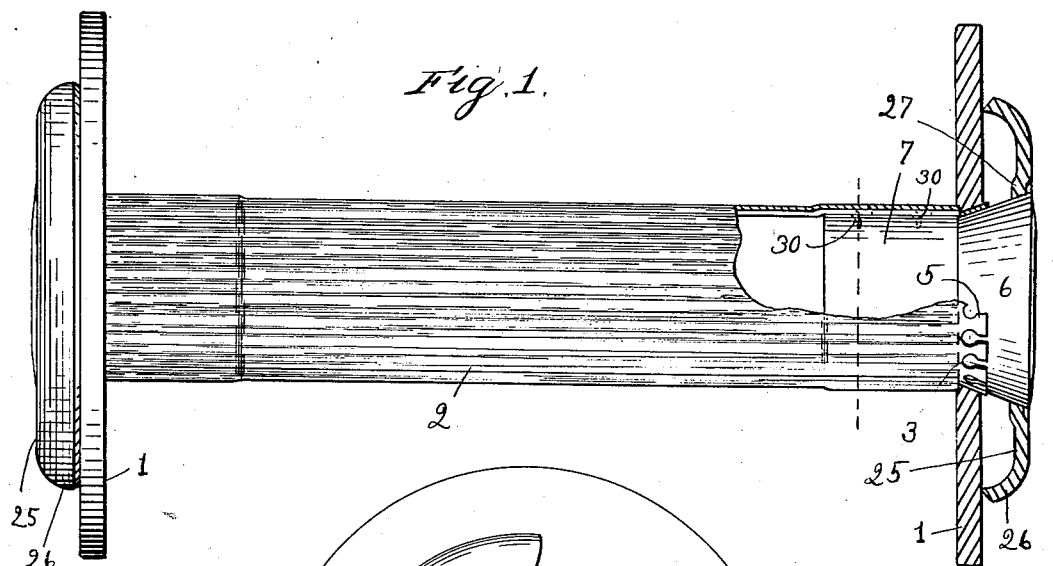
Fig. 1.
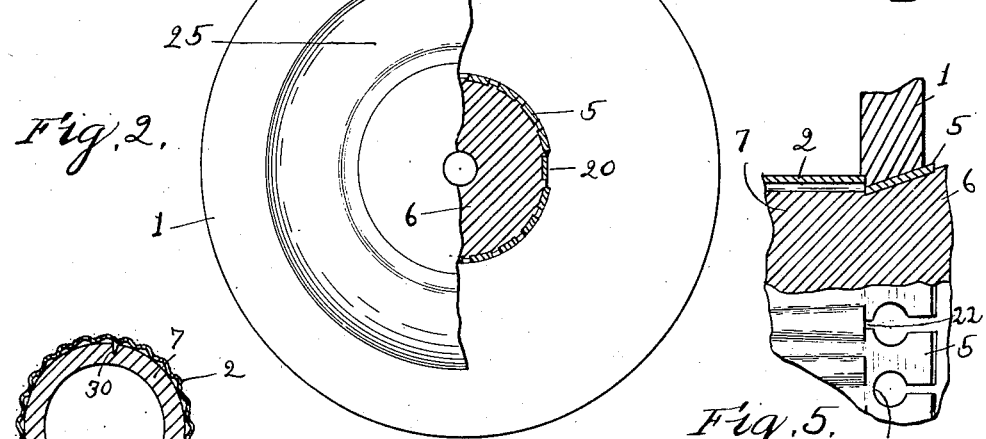
Fig. 2.
Fig. 3.
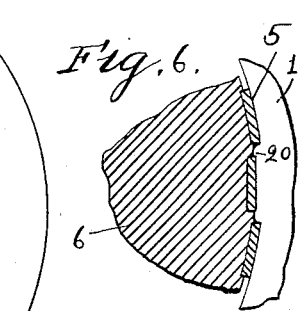
Fig. 5.
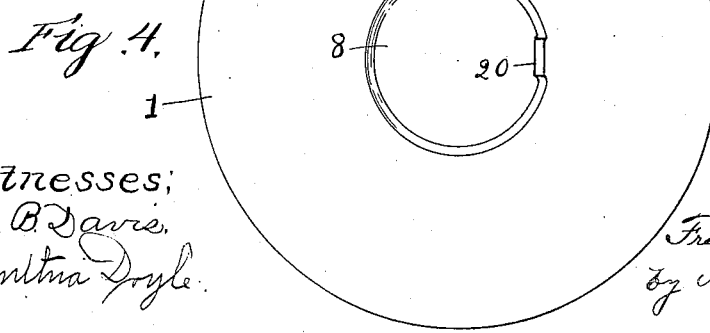
Fig. 4.
Fig. 6.
Witnesses:
H. B. Davis.
Cynthia Doyle.
Inventor:
Frederic B. Wood
by Noyes & Harriman
Attys.

UNITED STATES PATENT OFFICE.

FREDERIC BRUCE WOOD, OF PROVIDENCE, RHODE ISLAND, ASSIGNOR TO RHODE ISLAND FIBER SPOOL COMPANY, OF BOSTON, MASSACHUSETTS, A CORPORATION OF MAINE.

SPOOL.

No. 898,398.    Specification of Letters Patent.    Patented Sept. 8, 1908.

Application filed December 12, 1907. Serial No. 406,235.

*To all whom it may concern:*

Be it known that I, FREDERIC B. WOOD, of Providence, county of Providence, State of Rhode Island, have invented an Improvement in Spools, of which the following description, in connection with the accompanying drawings, is a specification, like characters on the drawings representing like parts.
This invention relates to spools and is an improvement upon the spool shown in Letters Patent # 782942 dated February 21, 1905 granted to me. The spool shown in said patent is designed and intended to be practically indestructible, yet light in weight, and inexpensive to manufacture. Sometimes the heads of the spools are made very large in diameter and in such case much difficulty has been encountered in making them strong enough to withstand the rough usage to which the spool is subjected. If made proportionately thicker they are correspondingly heavier and are cumbersome and also costly and owing to their increased weight are more liable to become broken when the spools are thrown about. Therefore, this means for strengthening the heads has not proved entirely satisfactory.

I have invented means for strengthening the heads so that they may be made quite thin and yet capable of withstanding rough usage to which the spool is subjected.

This invention consists in providing the heads of the spool with reinforcing plates;
and in so constructing the reinforcing plates that they may be applied to the heads in such manner as to afford the greatest degree of reinforcement; and in so constructing the reinforcing plates that they may be made very thin and yet suitably reinforce the heads.

My invention also has for its object to provide means for securing the reinforcing plates in position on the spool and to so construct said means that for convenience and simplicity the same means may be employed for securing both the heads and the reinforcing plates to the barrel of the spool.

In the spool shown in the patent the corrugated barrel has plain or uncorrugated end portions which are cut to form dovetailed fingers or wedges and the heads are each formed with a center hole to receive the uncorrugated end of the barrel and to enable them to rest against the ends of the outward corrugations on the barrel which form shoulders. Said center hole is partially counterbored and the end portions of the dovetail fingers are bent or flared outwardly to engage the counterbored portion of the center hole by a plug which is driven into the end of the barrel and which is formed with a cylindrical body and a tapering head. The end portions of the dovetailed fingers are intended to be embedded or set into the counterbored portions of the heads to prevent the same from turning and also into the plug to form wedges to hold the plug and prevent the heads from coming off. When the material composing the heads is made harder than the material composing the plug, then the fingers sink into the plug instead of into both the plug and head and consequently the head is not prevented from turning. Furthermore, only the end portions of the fingers are utilized as wedges, and being quite short do not obtain as firm a grip on the plug and head as is desired. Furthermore, the head merely resting against the ends of the corrugations on the barrel the yarns are liable to be drawn into the narrow spaces between the ends of the corrugations and the head which is objectionable.

Therefore another object of my invention is to provide for overcoming these objections, by providing the head with a key by which it is prevented from turning, by counterboring the center hole from side to side of the head and correspondingly tapering the head of the plug so that the dove-tail fingers may be utilized as wedges for their entire length, and by embedding the ends of the corrugations on the barrel in the material of the head.

In addition to the numerous advantages set forth in the patent for the employment of a corrugated barrel such a barrel is slightly expansible diametrically and will better engage and hold the cylindrical body of the plug but to derive the benefit of this function of the corrugated barrel the plain portions at the ends of the barrel must be split opposite one or more of the outward corrugations. The barrel is thus provided with expansible end portions.

Therefore another object of my present invention is to provide the barrel of the spool with expansible end portions adapted to be expanded into the center hole of the heads by the plugs which are driven into the ends of the barrel.

Figure 1 shows in front elevation and partial section a spool embodying this invention. Fig. 2 is an end view and partial section of the spool shown in Fig. 1. Fig. 3 is a transverse section of the barrel of the spool taken on the dotted line Fig. 1. Fig. 4 is a detail of one of the heads showing the counterbored center hole and key. Fig. 5 is an enlarged detail showing the end of one of the corrugations embedded in the material of the head, and also showing the split uncorrugated end of the barrel opposite the end of one of the outwardly extended corrugations. Fig. 6 is a sectional detail showing the dovetailed fingers embedded in the plug and head.

1—1 are flat circular disks which serve as the heads of the spool. These heads are each provided with a center hole 8 which is counterbored from end to end or from side to side of the head, and at said center hole a key 20 is provided which consists of a portion of the head projecting a short distance into the center hole. The end of the key is or may be beveled.

2 represents the corrugated tubular barrel having plain or uncorrugated ends 3. The outward corrugations of the barrel terminate abruptly at the uncorrugated portions 3 and the ends of said outward corrugations form shoulders 4 at such points. The uncorrugated end portions are cut to form dovetailed fingers 5. Said end portions are of suitable diameter to project through the center holes in the heads, and the dovetailed fingers are made long enough to extend entirely through said holes and even may project a short distance at the opposite sides of the heads. The uncorrugated end portions of the barrel are split, as at 22 see Fig. 5, at one or more points opposite one or more of the outward corrugations and between the dovetailed fingers, to enable the end portions to be expanded and thereby provide for expanding the end portions of the barrel when the plugs, to be described, are driven into the ends of the barrel. They may be split by driving in the tapered plugs or they may have been previously split by any suitable means.

25 represents one of the reinforcing plates, which are provided for the purpose of reinforcing the heads. This plate, like the head, is preferably made of paper fiber, tough and springy, and in the form of a circular disk having a center hole through it which is counterbored from end to end. The outer edge of the plate is bent out of the plane of the body portion, as shown at 26, forming a dished plate, so that the plate may be arranged with its outer edge only in engagement with the outer side of the head. This plate is made smaller in diameter than the head so that its outer edge will engage the head at a point substantially midway between the edge of the center hole and the outer edge of the head, such point of engagement being remote from the center hole, but this point of engagement may be varied according to the relative sizes of the head and reinforcing plate. The inner edge of the plate, at the center hole, is offset or depressed, as at 27, so as to engage the plug at a point a short distance from its end, and as the plug is tapered the reinforcing plate, thus offset will be very securely held by it preferably under sufficient pressure to give a spring effect.

The plug consists of a tapered head 6 and a cylindrical body 7. The tapered head is made of suitable diameter to fit the center holes in the reinforcing plate and head and is made long enough to project entirely through the center holes of both the reinforcing plate and the head, and the cylindrical body is made of suitable diameter to snugly fit the opening in the end of the barrel and long enough to project into the barrel a considerable distance. The plug is driven into the end of the barrel with a severe pressure and acts to hold the parts assembled and also to flare outwardly the several dovetailed fingers, causing them to become embedded in the material of the plug, and slightly into the material of the head; also causing the key to become wedged between or by the dovetail fingers so as to hold the head from turning. As the center hole in the head is counter bored from end to end and the tapered head extends entirely through the head, the dovetailed fingers will be flared outwardly from end to end and will become embedded in the head for their entire length. The head is driven into the barrel far enough to force the ends of the outward corrugations on the barrel into the material of the head to thereby embed them therein.

In case it is not desired to embed the ends of the outward corrugations in the material of the head said head will not be driven so far and in such case will merely rest against the ends of the corrugations.

In addition to securing the parts together by means of the tapered plugs, the barrel is punctured at each end at points between the outward corrugations, to thereby form spurs 30, which project inwards into the material of the cylindrical body of the plugs.

Having thus described my invention, what I claim as new and desire to secure by Letters Patent is:—

1. In a spool, a barrel, heads on its ends having center holes, reinforcing-plates for said heads also having center holes made larger in diameter than the center holes in the heads, and plugs having tapered heads for engaging the aforesaid heads and plates, said plugs projecting through the holes in the plates and heads and entering the barrel to hold the parts assembled, substantially as described.

2. In a spool, a barrel, heads on its ends, dished reinforcing plates, the edges only of which engage said heads remote from the center thereof, and means engaging the central portions of said plates acting to draw said central portions inward and thereby forcing the edges of said plates in firm engagement with the heads, substantially as described.

3. In a spool, a barrel, heads on its ends having center holes, reinforcing plates for said heads also having center holes made larger in diameter than the center holes in the heads, plugs adapted to be driven into the ends of the barrel having tapered heads which engage both the reinforcing plates and the heads, substantially as described.

4. In a spool, a barrel having a plurality of dovetailed fingers, heads on its ends, reinforcing plates for said heads, wedging plugs for holding said reinforcing plates in firm engagement with the heads and for also securing the heads to the barrel, said plugs being held against relative movement by the dovetailed fingers which are embedded therein substantially as described.

5. In a spool, a tubular corrugated barrel having uncorrugated ends, the ends of the outward corrugations forming shoulders at the junction with the uncorrugated ends, and heads placed on said uncorrugated ends into one side of which the ends of the outward corrugations are embedded, substantially as described.

6. In a spool, a tubular corrugated barrel having uncorrugated ends, split at a point opposite the ends of one of the outward corrugations, heads placed on said uncorrugated ends, and plugs driven into the ends of the barrel which expand both the corrugated and uncorrugated end portions of the barrel, substantially as described.

7. In a spool, a barrel having a shoulder and having a plurality of dovetailed fingers extending beyond said shoulder, a head having a center hole to receive said fingers which is counterbored from end to end, and a plug having a tapered head adapted to be driven into the end of the barrel, its tapered head extending entirely through the counterbored center hole and acting to flare outwardly said fingers and embed them in the material of the plug from end to end, substantially as described.

8. In a spool, a barrel having a shoulder and having a plurality of outwardly extended dovetailed fingers, a head having a center hole shaped to provide an inwardly extended portion at one side of it, forming a key, and a plug driven into the end of the barrel having a tapered head for forcing the fingers outwardly into engagement with the head and key, substantially as described.

9. In a spool, a barrel, heads on its ends having center holes, dished reinforcing-plates for said heads having central offset portions formed with center holes of a diameter larger than the diameter of the center holes in the heads, the edges only of said plates engaging the heads remote from the center thereof, and plugs projecting into and engaging the ends of the barrel having tapered heads which project through the center holes of both the heads and reinforcing plates, substantially as described.

10. A spool having a hollow corrugated metal barrel and annular heads of tough fibrous material, and an annular spring plate of tough, fibrous springy material for reinforcing each head, combined with wedging plugs driven through the holes in each plate and head and into the ends of the barrel which expand the ends of the barrel and hold the plates, heads, barrel and plugs firmly in place, substantially as described.

In testimony whereof, I have signed my name to this specification, in the presence of two subscribing witnesses.

FREDERIC BRUCE WOOD.

Witnesses:
WM. E. EVANS,
LEONARD B. BUCHANAN.